(12) United States Patent
Hosabettu et al.

(10) Patent No.: US 10,956,730 B2
(45) Date of Patent: Mar. 23, 2021

(54) METHOD AND SYSTEM FOR IDENTIFYING BOLD TEXT IN A DIGITAL DOCUMENT

(71) Applicant: Wipro Limited, Bangalore (IN)

(72) Inventors: Raghavendra Hosabettu, Bengaluru (IN); Tarun Mishra, Chandausi (IN)

(73) Assignee: Wipro Limited, Bangalore (IN)

(*) Notice: Subject to any disclaimer, the term of this patent is extended or adjusted under 35 U.S.C. 154(b) by 66 days.

(21) Appl. No.: 16/370,946

(22) Filed: Mar. 30, 2019

(65) Prior Publication Data

US 2020/0265225 A1 Aug. 20, 2020

(30) Foreign Application Priority Data

Feb. 15, 2019 (IN) .............................. 201941006150

(51) Int. Cl.
| | |
|---|---|
| *G06K 9/52* | (2006.01) |
| *G06K 9/00* | (2006.01) |
| *G06K 9/38* | (2006.01) |
| *G06T 7/60* | (2017.01) |

(52) U.S. Cl.
CPC .......... *G06K 9/00463* (2013.01); *G06K 9/38* (2013.01); *G06T 7/60* (2013.01); *G06T 2207/30176* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,995,661 | A * | 11/1999 | Amidei | G06T 7/12 358/462 |
| 6,741,745 | B2 | 5/2004 | Dance et al. | |
| 10,127,673 | B1 * | 11/2018 | Ben Khalifa | G06K 9/00463 |
| 10,169,650 | B1 * | 1/2019 | Ming | G06K 9/44 |
| 10,192,132 | B1 * | 1/2019 | Rivard | G06K 9/325 |
| 10,445,569 | B1 * | 10/2019 | Lin | G06F 40/279 |

(Continued)

OTHER PUBLICATIONS

Saikrishna et al., Script Independent Detection of Bold Words in Multi Font-Size Documents, retrieved from internet: <https://ieeexplore.ieee.org/document/6776180>.

(Continued)

*Primary Examiner* — Cindy Trandai
(74) *Attorney, Agent, or Firm* — Finnegan, Henderson Farabow, Garrett & Dunner, LLP

(57) ABSTRACT

Disclosed herein is a method and device for identifying bold text in a digital document. The system receives image of digital document which comprises text. The system applies bounding box for each text in the image and scans predefined number of lines in each bounding box to identify width values of pixels. Thereafter, system identifies most occurring width value of pixels among the width values of pixels in each bounding box. The most occurring width value of pixels in each bounding box is identified as box width of corresponding bounding box. The system compares box width of each bounding box with threshold box width. If box width is greater than threshold box width, system identifies text of the bounding box whose box width exceeds threshold box width as bold text. The present disclosure efficiently identifies bold text in digital document based on width values of pixels with less computational power.

13 Claims, 8 Drawing Sheets

(56) References Cited

U.S. PATENT DOCUMENTS

| | | | | |
|---|---|---|---|---|
| 2009/0180694 A1* | 7/2009 | Chen | ............... | G06K 9/3208 |
| | | | | 382/185 |
| 2011/0158483 A1* | 6/2011 | Ming | ............ | G06K 9/00463 |
| | | | | 382/112 |
| 2015/0123988 A1* | 5/2015 | Ohmori | ........... | G06F 3/03545 |
| | | | | 345/594 |
| 2017/0255597 A1* | 9/2017 | Sinn | ................. | G06F 40/109 |
| 2018/0284954 A1* | 10/2018 | Alcorn | ............... | G06F 3/013 |
| 2019/0163971 A1* | 5/2019 | Agarwal | ......... | G06K 9/00449 |

OTHER PUBLICATIONS

Yadav et al., Detection of Bold and Italic Character in Devanagari Script, retrieved from internet: <https://www.semanticscholar.org/paper/Detection-of-Bold-and-Italic-Character-in-Script-Yadav-Mazumdar/3386cbc3647c1bf07693831746f9a88fc5a773c5>.

Javed et al., Automatic Detection of Font Size Straight From Run Length Compressed Text Documents, International Journal of Computer Science and Information Technologies, vol. 5(1), 2014, pp. 818-825.

* cited by examiner

― 105

Artificial Intelligence

In computer science, artificial intelligence (AI), sometimes called machine intelligence, is intelligence demonstrated by machines, in contrast to the natural intelligence displayed by humans and other animals. Computer science defines AI research as the study of "intelligent agents": any device that perceives its environment and takes actions that maximize its chance of successfully achieving its goals. More specifically, Kaplan and Haenlein define AI as "a system's ability to correctly interpret external data, to learn from such data, and to use those learnings to achieve specific goals and tasks through flexible adaptation". Colloquially, the term "artificial intelligence" is applied when a machine mimics "cognitive" functions that humans associate with other human minds, such as "learning" and "problem solving"

Fig.3a

Artificial Intelligence

In computer science, artificial intelligence (AI), sometimes called machine intelligence, is intelligence demonstrated by machines, in contrast to the natural intelligence displayed by humans and other animals. Computer science defines AI research as the study of "intelligent agents": any device that perceives its environment and takes actions that maximize its chance of successfully achieving its goals. More in detail, Kaplan and Haenlein define AI as "a system's ability to correctly interpret external data, to learn from such data, and to use those learnings to achieve specific goals and tasks through flexible adaptation". Colloquially, the term "artificial intelligence" is applied when a machine mimics "cognitive" functions that humans associate with other human minds, such as "learning" and "problem solving".

Bounding Box 204

METHOD AND SYSTEM FOR IDENTIFYING BOLD TEXT IN A DIGITAL DOCUMENT

This application claims the benefit of Indian Patent Application Serial No. 201941006150 filed Feb. 15, 2019 which is hereby incorporated by reference in its entirety.

FIELD

The present subject matter is generally related to data processing and more particularly, but not exclusively, to a method and system for identifying bold text in a digital document.

BACKGROUND

In day to day document/information processing, bold text in a document means the intensity of letter/word is more compared to its surrounding words and it signifies some importance. For example, in some documents such as Statement of Work (SOW), Measurement System Analysis (MSA), many important terms such as company name, contract date, contract termination date, and various clauses will be in bold. There may be a need to extract and interpret these important terms from such documents. Further for morphological analysis or semantic analysis there may be a need to extract words such as titles, section header, table header, figure names from the documents which are in bold font. There may exist a scenario wherein some white papers (or research papers) may not include table of contents. Hence there arises a need to extract words which are in bold which indicates importance of such words to generate table of contents. If the bold text is not identified, the user may have to go through the whole document to understand or reach the contents in the document which is a tedious process.

The existing solutions to extract the entities or bold text from documents such as SOW or MSA are multilevel and highly time consuming as the document text style such as font, height, width and the like may vary across the document. Further for morphological analysis of documents, bold text plays very important part in section segmentation and important information extraction for which machine learning algorithms are required. The machine learning algorithms may require a lot of training data and training time as well.

The information disclosed in this background of the disclosure section is only for enhancement of understanding of the general background of the invention and should not be taken as an acknowledgement or any form of suggestion that this information forms the prior art already known to a person skilled in the art.

SUMMARY

Disclosed herein is a method for identifying bold text in a digital document. The method comprises receiving, by a bold text identification system, an image of the digital document comprising plurality of text. The method comprises applying a bounding box for each of the plurality of text in the image once the image is received. Thereafter, the method comprises scanning predefined number of lines in each bounding box to identify width values of pixels in each scanned line. Once the width value of pixels is identified, the method comprises identifying most occurring width value of pixels among the width values of pixels in each bounding box. The most occurring width value of the pixels in each bounding box is identified as box width of the corresponding bounding box. Thereafter, the method comprises comparing the box width of each bounding box with a threshold box width. Based on the comparison, the method comprises identifying bold text from the plurality of text in the digital document when the box width of bounding box on the text is greater than the threshold box width.

Further, the present disclosure discloses a system for identifying a bold text in a digital document. The system comprises a memory communicatively coupled to the processor. The memory stores processor-executable instructions, which, on execution, causes the processor to receive an image of the digital document comprising plurality of text. Thereafter, the processor applies a bounding box for each of the plurality of text in the image. Once the bounding box is applied, the processor scans predefined number of lines in each bounding box to identify width values of pixels in each scanned line. Thereafter, the processor identifies most occurring width value of pixels among the width values of pixels in each bounding box. The most occurring width value of the pixels in each bounding box is identified as box width of the corresponding bounding box. Once the box width is identified, the processor compares the box width of each bounding box with a threshold box width to identify the bold text. The processor identifies the text corresponding to the bounding box with box width greater than the threshold box width as the bold text.

Furthermore, the present disclosure comprises a non-transitory computer readable medium including instructions stored thereon that when processed by at least one processor causes a bold text identification system to receive an image of the digital document comprising plurality of text. Further, the instructions cause the processor to apply by the bold text identification system, a bounding box for each of the plurality of text in the image. Additionally, the instructions cause the processor to scan a predefined number of lines in each bounding box to identify width values of pixels in each scanned line. Furthermore, the instructions cause the processor to identify the most occurring width value of pixels among the width values of pixels in each bounding box. The most occurring width value of the pixels in each bounding box is identified as box width of the corresponding bounding box. Further, the instructions cause the processor to compare the box width of each bounding box with a threshold box width. Finally, the instructions cause the processor to identify the bold text from the plurality of text in the digital document when the box width of bounding box on the text is greater than the threshold box width.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which:

FIG. 3a shows exemplary image of a digital document in accordance with some embodiments of the present disclosure;

FIG. 3b shows an exemplary image of a digital document on which bounding box is applied on each text in the image in accordance with some embodiments of the present disclosure;

Figure 1:
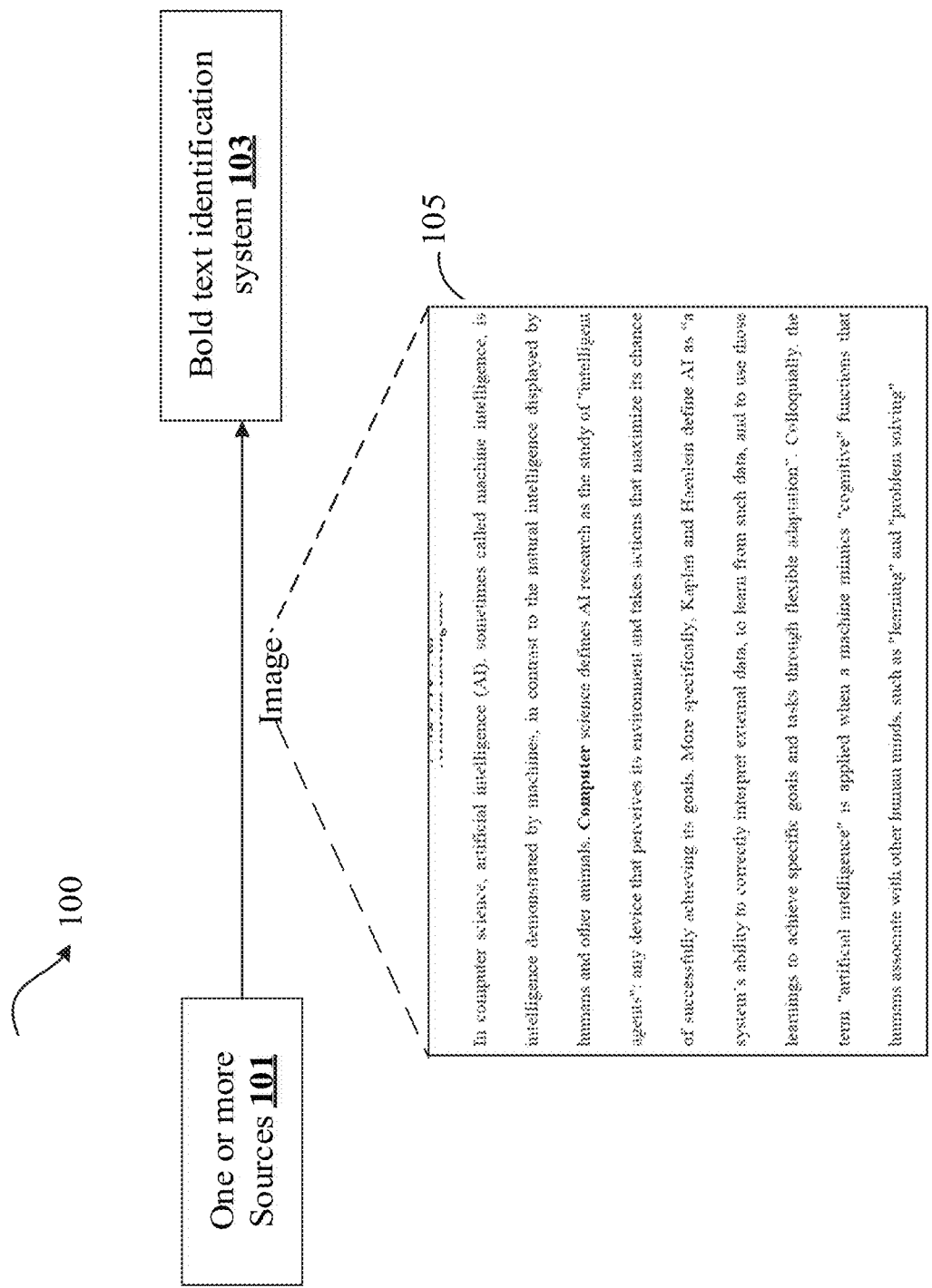
FIG. 1 shows an exemplary environment for identifying bold text in a digital document in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the scope of the disclosure.

The terms "comprises", "comprising", "includes", "including" or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and system for identifying a bold text in a digital document by a bold text identification system. At first, the bold text identification system may receive an image of the digital document. The image may comprise a plurality of text. The plurality of text may include at least one of words and alphabets. The image may be obtained from an image capturing device such as camera or a scanner or may be received from a database associated with the system. The bold text identification system may apply a bounding box for each of the plurality of text in the image and thereafter scan predefined number of lines in each bounding box to identify width values of pixels in each scanned line. Once the width values of pixels in each scanned line is identified, the system may identify most occurring width value of pixels among the width values of pixels in each bounding box. The most occurring width value of the pixels in each bounding box is identified as box width of the corresponding bounding box. Once the box width is identified, the system may compare the box width of each bounding box with a threshold box width. If the box width of the bounding box is greater than the threshold box width, then the system may identify the text of the bounding box with box width exceeding the threshold box width as the bold text. In this manner, the present disclosure provides an efficient mechanism for identifying the bold text in the digital document based on width values of pixels in the text with less computational power.

In the following detailed description of the embodiments of the disclosure, reference is made to the accompanying drawings that form a part hereof, and in which are shown by way of illustration of embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary environment for identifying bold text in a digital document in accordance with some embodiments of the present disclosure.

The environment 100 may comprise one or more sources 101 and a bold text identification system 103 (alternately referred as system). The one or more sources 101 may be a camera or a scanner which provides an image 105 of a digital document to the bold text identification system 103. The image 105 may include a plurality of text as shown in FIG. 1. The text may be at least one of alphabet and words. Once the system 103 receives the image 105, the system 103 may apply a bounding box on each text in the image 105. The bounding box is an enclosing box around the text as shown in FIG. 2b. Once the bounding box is applied, the system 103 may scan predefined number of lines in each bounding box to identify width values of pixels in each scanned line. As an example, there may be 7 scan lines which may be scanned by the system 103. The scan may be performed in at least one of vertical or horizontal direction i.e. the scan lines may be placed vertically or horizontally. If the scan lines are places vertically then the scan may performed in the vertical direction. If the scan lines are placed horizontally, then the scan may be performed in the horizontal direction.

In an embodiment, the width value of pixels is identified based on presence of pixels in each scan. If there is a presence of the pixel, the system 103 detects the pixel value to be 255 and until the pixel value is detected to be 255, the system 103 keeps a count. For example, if there is presence of pixel 5 times i.e. for 5 continuous times, the value of the pixel is detected to be 255, then the system 103 identifies the width value of the pixel as 5. Similarly, if there is no presence of the pixel, then the value of the pixel is 0 and hence the width value of the pixel is 0.

In an embodiment, once the width values of pixels in each scanned line is identified, the system 103 may identify most occurring width value of pixels among the width values of pixels in each bounding box. The most occurring width value of the pixels in each bounding box is identified as box width of the corresponding bounding box. As an example, the most occurring width value of the pixels among the width value of pixels in the bounding box may be 6. Hence, the box width corresponding to the bounding box may be 6. Once the box width is identified, the system 103 may compare the box width of each bounding box with a threshold box width. In an embodiment, to identify the threshold box width, the system 103 may first identify a count (Fcount) of occurrence of first most occurring width value of the pixels among the width values of pixels in each bounding box. Thereafter, the system 103 may identify a count (Scount) of occurrence of second most occurring width value of the pixels among the width values of pixels in each bounding box. Based on the Scount, Fcount and a predefined constant value, the system 103 may identify one of the first most occurring width value or the second most occurring width value as the threshold box width. As an example, the threshold box width may be 5.

In an embodiment, if the box width of the bounding box is greater than the threshold box width, then the system 103 may identify the text of the bounding box with box width exceeding the threshold box width as the bold text. Since in the present scenario, the box width corresponding to the bounding box is 6 which is greater than the threshold box width which is 5, the text corresponding to the bounding box may be identified as the bold text.

Figure 2A:
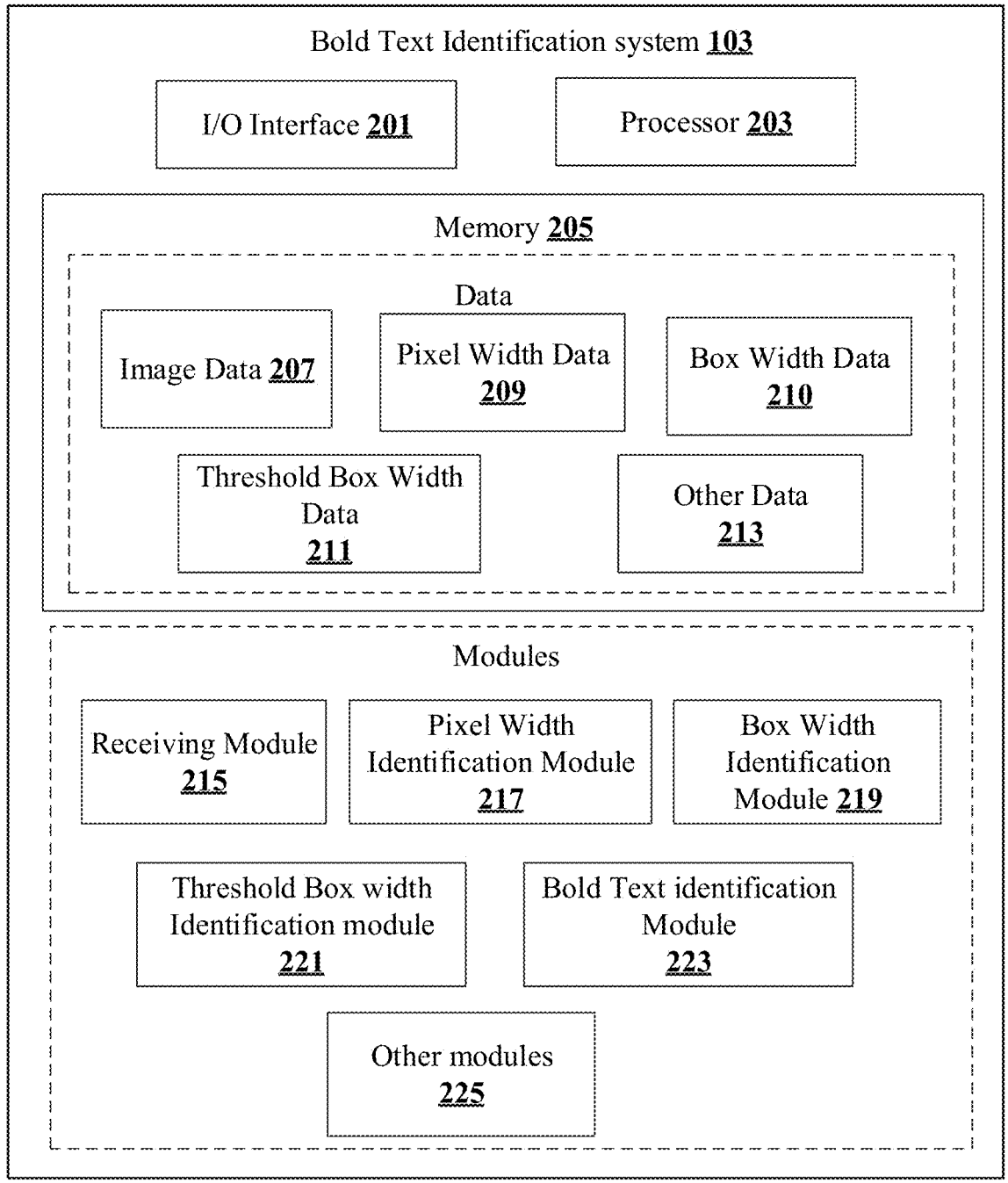
FIG. 2a shows block diagram of a bold text identification system in accordance with some embodiments of the present disclosure.
Figure 2B:
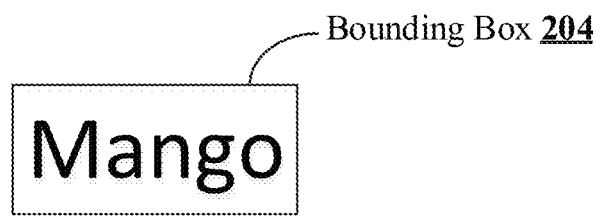
FIG. 2b shows an exemplary bounding box applied on a text in accordance with some embodiments of the present disclosure.

FIG. 2*a* shows block diagram of a bold text identification system in accordance with some embodiments of the present disclosure.

The bold text identification system 103 may include an I/O interface 201, a processor 203, and a memory 205. The I/O interface 201 may be configured to receive an image 105 of a digital document and to provide information of bold text in the digital document. The memory 205 may be communicatively coupled to the processor 203. The processor 203 may be configured to perform one or more functions of the bold text identification system 103.

In some implementations, the bold text identification system 103 may include data and modules for performing various operations in accordance with embodiments of the present disclosure. In an embodiment, the data may be stored within the memory 205 and may include, without limiting to, image data 207, pixel width data 209, box width data 210, threshold box width data 211 and other data 213.

In some embodiments, the data may be stored within the memory 205 in the form of various data structures. Additionally, the data may be organized using data models, such as relational or hierarchical data models. The other data 213 may store data, including temporary data and temporary files, generated by the modules for performing various functions of the bold text identification system 103.

In an embodiment, one or more modules may process the data of the bold text identification system 103. In one implementation, the one or more modules may be communicatively coupled to the processor 203 for performing one or more functions of the bold text identification system 103. The modules may include, without limiting to, a receiving module 215, a pixel width identification module 217, a box width identification module 219, a threshold box width identification module 221, a bold text identification module 223 and other modules 225.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. In an embodiment, the other modules 225 may be used to perform various miscellaneous functionalities of the bold text identification system 103. It will be appreciated that such modules may be represented as a single module or a combination of different modules. Furthermore, a person of ordinary skill in the art will appreciate that in an implementation, the one or more modules may be stored in the memory 205, without limiting the scope of the disclosure. The said modules when configured with the functionality defined in the present disclosure will result in a novel hardware.

In an embodiment, the receiving module 215 may be configured to receive a digital document from one or more sources 101. As an example, the one or more sources 101 may be a camera or a scanner. The digital document may include a plurality of text. The received image 105 is stored as the image data 207. The plurality of text may include at least one of alphabets, words and sentences. In an embodiment, binarization is performed on the received image 105 by thresholding the digital image which may be in a grayscale or colour image. The binarization may be performed using techniques which may include, but not limited to, Otsu, iterative global thresholding and hybrid binarization technique. The binarization may be performed in order to separate an object in the image 105 from a background based on intensities or pixel values.

In an embodiment, the pixel width identification module 217 may be configured to identify width value of pixels in the digital document. The image 105 may include plurality of text such as alphabets and words. In an embodiment, for each word or the alphabet a bounding box is applied. The bounding box may be applied based on predefined operations such as morphological operations. The bounding box is the enclosing box on the text. Once the bounding box is applied, each bounding box is partitioned based on predefined number of scan lines. As an example, if there are 7 scan lines 206 each scan line will be scanned by the system 103 to identify the width value of the pixels. As an example, the bounding box 204 may be applied on the word "Mango" as shown in FIG. 2*b*.

Figure 2C:
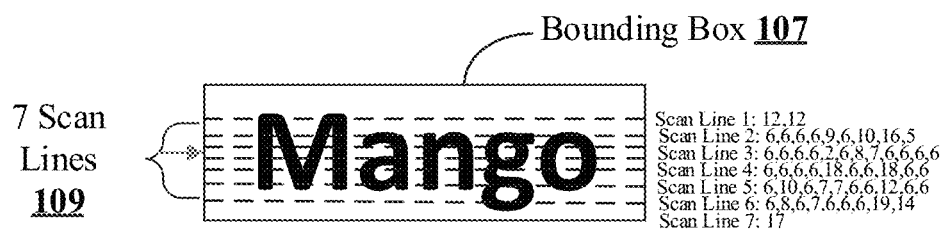
FIG. 2c shows exemplary representation of scan lines in the bounding box for identifying width value of pixels in accordance with some embodiments of the present disclosure.

The bounding box 204 may include 7 scan lines 206 as shown in FIG. 2*c*. Each scan line is scanned to identify the width value of the pixels. The exemplary width value of pixels in each scan line is indicated adjacent to each scan line.

For example, for scan line 1, the width value of pixels may be 12, 12. The width value of pixels are identified based on presence of pixels in each scanned line. If there is a presence of the pixel, the system 103 detects the pixel value to be 255 and until the pixel value is detected to be 255, the system 103 keeps a count. For example, in scan line 1, the system 103 detects the presence of pixels for 12 counts and hence the width value of the pixel is 12. Similarly, when there is absence of pixels, the pixel value is zero and hence the width value of the pixels is also 0. Therefore, for scan line 1, the width value of pixels are 12, 12. Similarly, the width value of the pixels for scan line 2 is 6, 6, 6, 6, 9, 6, 10, 16, 5. The width value of pixels for scan line 3 is 6, 6, 6, 6, 2, 6, 8, 7, 6, 6, 6, 6. The width value of pixels for scan line 4 is 6, 6, 6, 6, 18, 6, 6, 18, 6, 6. The width value of pixels for scan line 5 is 6, 10, 6, 7, 7, 6, 6, 12, 6, 6. The width value of pixels for scan line 6 is 6, 8, 6, 7, 6, 6, 19, 14 and the width value of pixels for scan line 7 is 17. The width value of the pixels in each scan line is stored as the pixel width data 209.

In an embodiment, the box width identification module 219 may be configured to identify box width of each bounding box 204. The box width may be identified based on width value of the pixels. The most occurring width value among the width value of pixels of each scan line is considered. In the above example, the most occurring width value is 6. Hence 6 is the box width of the bounding box 204 on the text "Mango". The box width identified for each bounding box is stored as box width data 210.

In an embodiment, the threshold box width identification module 221 may be configured to identify threshold box width. The threshold box width may be identified based on Fcount, Scount and a predefined constant value. The Fcount is the count of occurrence of first most occurring width value of the pixels among the width values of pixels in each bounding box 204. The Scount is the count of occurrence of second most occurring width value of the pixels among the width values of pixels in each bounding box 204. In the above example, the first most occurring width value of the pixels is 6 and the count as an example may be 20. The second most occurring width value of pixels is 7 and the count as an example may be 5. The predefined constant value may be 2.

Once the Fcount and Scount is identified, the threshold box width may be identified based on the below equation 1.

$$\text{Scount} >= \text{Fcount}/m \qquad \text{Equation (1)}$$

If Scount>=Fcount/m then second most occurring width value of pixel is the threshold box width. If the Scount<Fcount/m then the first most occurring width value of pixels is the threshold box width. In the above example, Scount is 5, Fcount is 20 and m is 2. Fcount/m=20/2=10. Therefore, in this scenario Scount is less than Fcount/m 5<10. Hence, the first most occurring width value of pixels which is 6 is identified as the threshold box width which is stored as threshold box width data 211.

In an embodiment, the bold text identification module 223 may be configured to identify the bold text based on comparison of the box width of each bounding box 204 with the threshold box width. If the box width is greater than the threshold box width, then the text corresponding to the bounding box 204 with box width greater than the threshold box width may be identified as the bold text.

Exemplary Embodiment

As an example, the image 105 of a digital document as shown in FIG. 3a may be provided to the bold text identification system 103. The image 105 may include plurality of text such as alphabets, words and sentences. For example, the text may be "In", "Artificial", "Intelligence", "perceives", "computer" and the like. Upon receiving the image 105, the bold text identification system 103 may apply bounding box 204 for each text in the image 105. The image 105 upon which the bounding box 204 is applied is as shown in FIG. 3b. Once the bounding box 204 is applied, the bold text identification system 103 identifies width value of pixels for each bounding box 204 in the image 105. As an example, the width value of pixels identified for the bounding box 204 corresponding to the text "computer" is illustrated below.

Figure 3C:
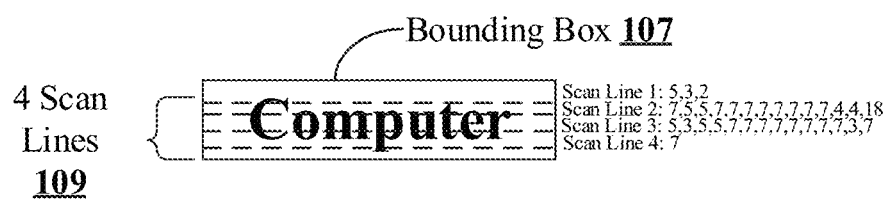
FIG. 3c shows another exemplary representation of scan lines in a bounding box for identifying width value of pixels in each scan line in accordance with some embodiments of the present disclosure.

As an example, the bounding box 204 corresponding to the text "computer" may be partitioned based on 4 scan lines 206. For each scan line, the width value of the pixels is identified as shown in FIG. 3c.

As an example, the width value of pixels for scan line 1 is: 5, 3, 2. The width value of pixels for scan line 2 is 7, 5, 5, 7, 7, 7, 7, 7, 7, 7, 7, 7, 4, 4, 18. The width value of pixels for scan line 3 is 5, 3, 5, 5, 7, 7, 7, 7, 7, 7, 7, 7, 3, 7. The width value of pixels for scan line 4 is 7. The most occurring width value of pixels is 7. Hence the box width value of the bounding box 204 corresponding to the text "Computer" is 7. Similarly, the box width is identified for each bounding box 204 in the image 105. The box width identified for each text is shown in FIG. 3b wherein the box width is represented on top of each bounding box 204. For example, the box width "5" is indicated on top of the text "science". Similarly, box width "7" is indicated on top of the text "computer". Once the box width is identified, the box width of each bounding box 204 is compared with threshold box width. As an example, the threshold box width may be 6. The box width corresponding to bounding box 204 is compared with the threshold box width. Only the box width corresponding to the bounding box 204 on the text "Computer" is 7 which is greater than the threshold box width. Hence the text "Computer" is identified as the bold text in the image 105.

Figure 4:
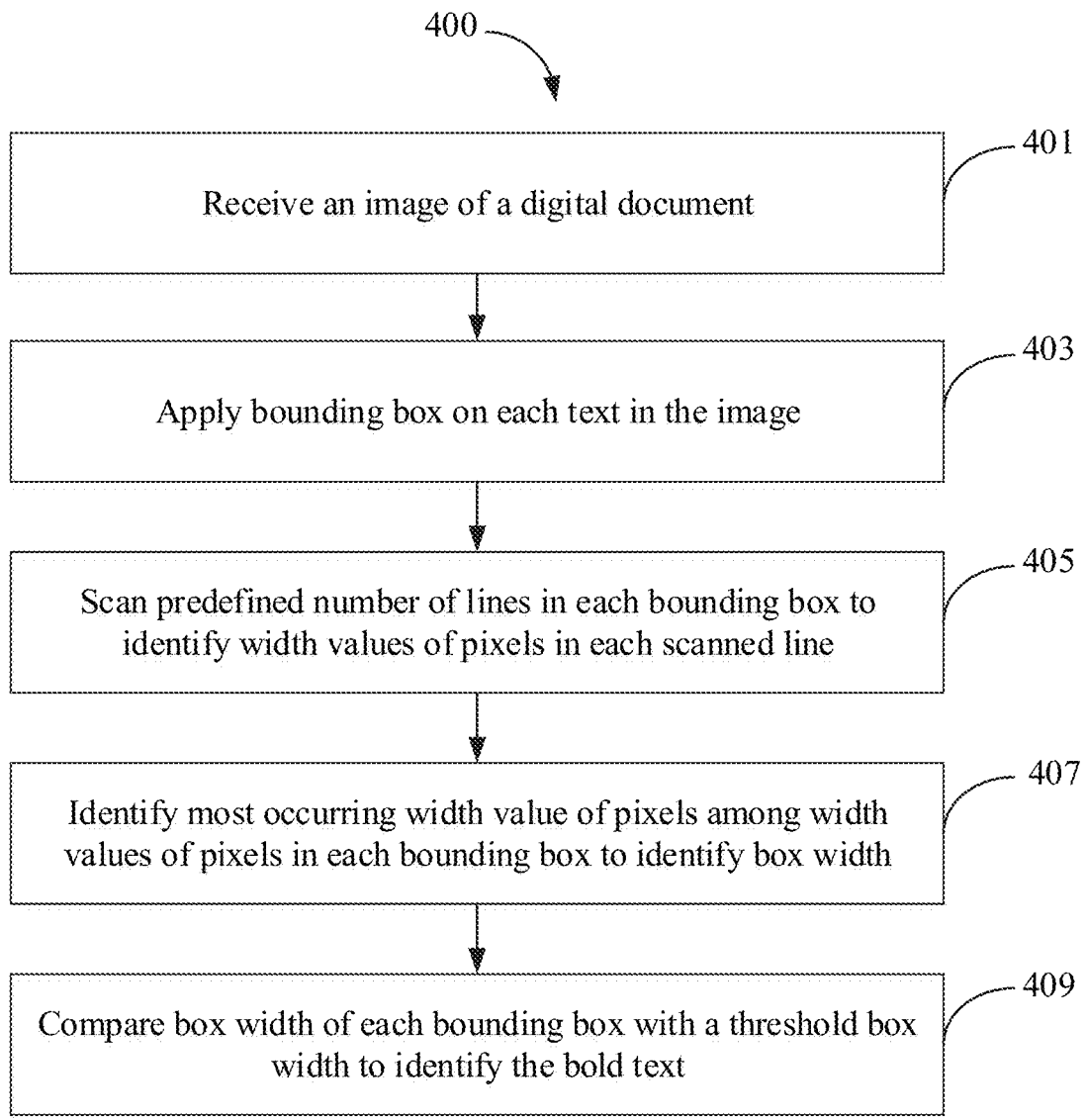
FIG. 4 shows a flowchart illustrating method of identifying bold text in a digital document in accordance with some embodiments of the present disclosure.

FIG. 4 shows a flowchart illustrating method of identifying bold text in a digital document in accordance with some embodiments of the present disclosure.

As illustrated in FIG. 4, the method 400 includes one or more blocks illustrating a method of identifying bold text in a digital document. The method 400 may be described in the general context of computer executable instructions. Generally, computer executable instructions can include routines, programs, objects, components, data structures, procedures, modules, and functions, which perform specific functions or implement specific abstract data types.

The order in which the method 400 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 401, the method 400 may include receiving digital document from one or more sources 101. As an example, the one or more sources 101 may be a camera or a scanner. The digital document may include a plurality of text. The plurality of text may include at least one of alphabets, words and sentences.

At block 403, the method 400 may include applying bounding box on each of the plurality of text in the image 105. As an example, the bounding box may be applied using predefined operations such as morphological operations. The bounding box is the enclosing box on the text.

At block 405, the method 400 may include scanning each predefined number of lines in each bounding box to identify width values of pixels in each scanned line. Each bounding box is partitioned based on predefined number of scan lines for scanning the bounding box. When each scan line is scanned, the width value of pixels in each scan line is identified.

At block 407, the method 400 may include identifying most occurring width value of pixels among the width values of pixels in each bounding box. The most occurring width value of the pixels in each bounding box is identified as box width of the corresponding bounding box.

At block 409, the method 400 may include comparing the box width of each bounding box with a threshold box width. The threshold box width may be identified based on Fcount, Scount and a predefined constant value. The Fcount is the count of occurrence of first most occurring width value of the pixels among the width values of pixels in each bounding box. The Scount is the count of occurrence of second most occurring width value of the pixels among the width values of pixels in each bounding box. The box width of each of the bounding box is compared with the threshold box width. If the box width of the bounding box is greater than the threshold box width, then the text corresponding to the bounding box with box width more than the threshold box width is identified as the bold text.

Computer System

Figure 5:
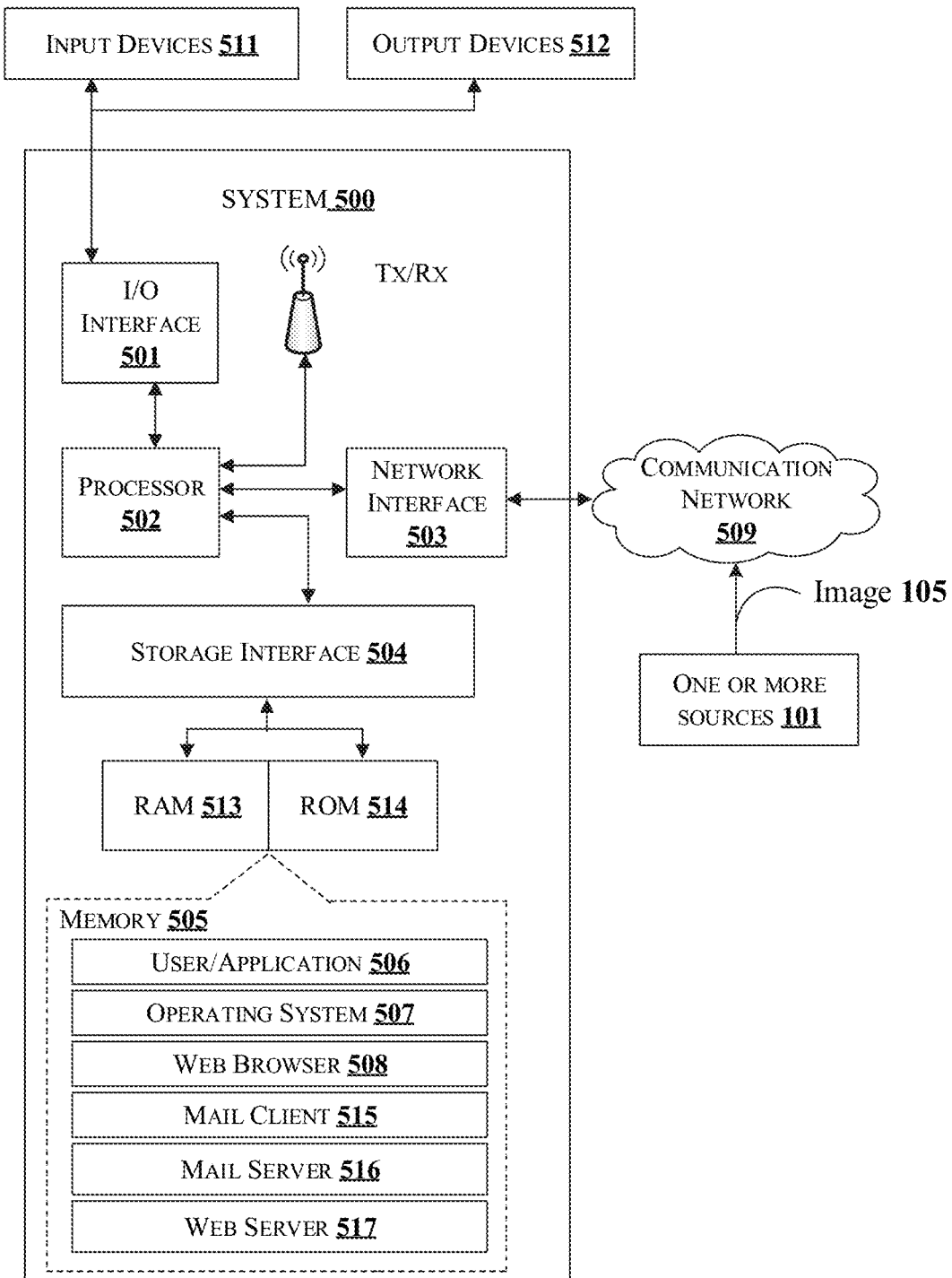
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 may be bold text identification system 103, which is used for identifying bold text in a digital document. The computer system 500 may include a central processing unit ("CPU" or "processor") 502. The processor 502 may comprise at least one data processor for executing program components for executing user or system-generated business processes. A user may include a person, a user in the computing environment 100, users using the bold text identification system 103, or such a device itself. The processor 502 may include specialized processing units such as integrated system (bus) controllers, memory management control units, floating point units, graphics processing units, digital signal processing units, etc.

The processor 502 may be disposed in communication with one or more input/output (I/O) devices (511 and 512) via I/O interface 501. The I/O interface 501 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc. Using the I/O interface 501, the computer system 500 may communicate with one or more I/O devices 511 and 512. In some implementations, the I/O interface 501 may be used to connect to one or more sources 101 such as camera or scanner to receive an image 105 of a digital document.

In some embodiments, the processor 502 may be disposed in communication with a communication network 509 via a network interface 503. The network interface 503 may communicate with the communication network 509. The network interface 503 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 503 and the communication network 509, the computer system 500 may communicate with the user to identify bold text to the user.

The communication network 509 can be implemented as one of the several types of networks, such as intranet or Local Area Network (LAN) and such within the organization. The communication network 509 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 509 may include a variety of network devices, including routers, bridges, servers, computing devices, storage devices, etc.

In some embodiments, the processor 502 may be disposed in communication with a memory 505 (e.g., RAM 513, ROM 514, etc. as shown in FIG. 5) via a storage interface 504. The storage interface 504 may connect to memory 505 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user/application 506, an operating system 507, a web browser 508, mail client 515, mail server 516, web server 517 and the like. In some embodiments, computer system 500 may store user/application data 506, such as the data, variables, records, etc. as described in this invention. Such databases may be implemented as fault-tolerant, relational, scalable, secure databases such as Oracle® or Sybase®.

The operating system 507 may facilitate resource management and operation of the computer system 500. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like. A user interface may facilitate display, execution, interaction, manipulation, or operation of program components through textual or graphical facilities. For example, user interfaces may provide computer interaction interface elements on a display system operatively connected to the computer system 500, such as cursors, icons, check boxes, menus, windows, widgets, etc. Graphical User Interfaces (GUIs) may be employed, including, without limitation, APPLE MACINTOSH® operating systems, IBM™ OS/2, MICROSOFT™ WINDOWS™ (XP™, VISTA™/7/8, 10 etc.), Unix® X-Windows, web interface libraries (e.g., AJAX™, DHTML™, ADOBE® FLASH™, JAVASCRIPT™, JAVA™, etc.), or the like.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory.

Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the Embodiment of the Present Disclosure are Illustrated Herein

In an embodiment, the present disclosure provides a method for identifying bold text in a digital document.

In an embodiment, the present disclosure uses width value of pixels to identify the bold text which consumes less computational power rather than the existing training methods which requires more computational power.

In an embodiment, the present disclosure provides a simple mechanism for bold text identification using an adaptive method applying of bounding box and identifying width value of pixels and hence identifies the bold text in a document quickly.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise. The enumerated listing of items does not imply that any or all the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for identifying bold text in a digital document, the method comprising:

receiving, by a bold text identification system, an image of the digital document comprising plurality of text;

applying, by the bold text identification system, a bounding box for each of the plurality of text in the image;

scanning, by the bold text identification system, predefined number of lines in each bounding box to identify width values of pixels in each scanned line;

identifying, by the bold text identification system, most occurring width value of pixels among the width values of pixels in each bounding box, wherein the most occurring width value of the pixels in each bounding box is identified as box width of the corresponding bounding box, wherein the width values of pixels are identified based on presence of pixels in each scanned line;

comparing, by the bold text identification system, the box width of each bounding box with a threshold box width; and identifying, by the bold text identification system, bold text from the plurality of text in the digital document when the box width of bounding box on the text is greater than the threshold box width.

2. The method as claimed in claim 1, wherein the threshold box width is identified by:

identifying a count (Fcount) of occurrence of first most occurring width value of the pixels among the width values of pixels in each bounding box;

identifying a count (Scount) of occurrence of second most occurring width value of the pixels among the width values of pixels in each bounding box; and identifying one of the first most occurring width value or the second most occurring width value as the threshold box width based on the Scount, Fcount and a predefined constant value.

3. The method as claimed in claim 1, wherein the scanning of each line in the bounding box is performed in at least one of horizontal or vertical direction.

4. The method as claimed in claim 1 further comprises performing binarization on the received image prior to applying the bounding box.

5. The method as claimed in claim 1, wherein the bounding box is applied by performing predefined operations on the image.

6. A bold text identification system for identifying bold text in a digital document comprising:

a processor; and a memory communicatively coupled to the processor, wherein the memory stores the processor-executable instructions, which, on execution, causes the processor to:

receive an image of the digital document comprising plurality of text;

apply a bounding box for each of the plurality of text in the image;

scan predefined number of lines in each bounding box to identify width values of pixels in each scanned line;

identify most occurring width value of pixels among the width values of pixels in each bounding box, wherein the most occurring width value of the pixels in each bounding box is identified as box width of the corresponding bounding box, wherein the width values of pixels are identified based on presence of pixels in each scanned line;

compare the box width of each bounding box with a threshold box width; and identify bold text from the plurality of text in the digital document when the box width of bounding box on the text is greater than the threshold box width.

7. The system as claimed in claim 6, wherein to identify the threshold box width, the instructions causes the processor to:
- identify a count (Fcount) of occurrence of first most occurring width value of the pixels among the width values of pixels in each bounding box;
- identify a count (Scount) of occurrence of second most occurring width value of the pixels among the width values of pixels in each bounding box; and
- identify one of the first most occurring width value or the second most occurring width value as the threshold box width based on the Scount, Fcount and a predefined constant value.

8. The system as claimed in claim 6, wherein the processor scans each line in the bounding box in at least one of horizontal or vertical direction.

9. The system as claimed in claim 6, wherein the processor performs binarization on the received image prior to applying the bounding box.

10. The system as claimed in claim 9, wherein the binarization is performed using techniques comprising Otsu, iterative global thresholding and hybrid binarization technique.

11. The system as claimed in claim 6, wherein the processor applies the bounding box by performing predefined operations on the image.

12. The system as claimed in claim 6, further comprises partitioning each boundary box based on predefined number of scan lines.

13. A non-transitory computer readable medium including instructions stored thereon that when processed by at least one processor causes bold text identification system to:
- receive an image of the digital document comprising plurality of text;
- apply by the bold text identification system, a bounding box for each of the plurality of text in the image;
- scan a predefined number of lines in each bounding box to identify width values of pixels in each scanned line;
- identify the most occurring width value of pixels among the width values of pixels in each bounding box, wherein the most occurring width value of the pixels in each bounding box is identified as box width of the corresponding bounding box, wherein the width values of pixels are identified based on presence of pixels in each scanned line;
- compare the box width of each bounding box with a threshold box width; and
- identify the bold text from the plurality of text in the digital document when the box width of bounding box on the text is greater than the threshold box width.

* * * * *